United States Patent
Emmerson et al.

(10) Patent No.: US 7,275,992 B2
(45) Date of Patent: Oct. 2, 2007

(54) MOBILE GAMING

(75) Inventors: Francis Emmerson, Windsor (GB); Peter Birch, Camberley (GB); Richard Hatch, Malvern (GB)

(73) Assignee: Nokia Corporation, Espoo (FI)

( * ) Notice: Subject to any disclaimer, the term of this patent is extended or adjusted under 35 U.S.C. 154(b) by 569 days.

(21) Appl. No.: 10/243,746

(22) Filed: Sep. 16, 2002

(65) Prior Publication Data
US 2003/0068602 A1    Apr. 10, 2003

(30) Foreign Application Priority Data
Oct. 5, 2001    (GB)    ................... 0123998.7

(51) Int. Cl.
*A63F 13/00* (2006.01)
(52) U.S. Cl. .................. 463/31; 463/1; 463/32; 463/33; 463/41
(58) Field of Classification Search ............... 463/1–8, 463/23, 31, 36, 37, 38, 39, 40, 52, 53, 41, 463/56, 54, 63, 32, 43; 273/333, 108.1, 440.1, 273/441, 445
See application file for complete search history.

(56) References Cited

U.S. PATENT DOCUMENTS

| | | | |
|---|---|---|---|
| 6,149,523 A | | 11/2000 | Yamada et al. |
| 6,267,674 B1 * | | 7/2001 | Kondo et al. ................. 463/32 |
| 6,273,822 B1 | | 8/2001 | Tanaka ......................... 463/43 |
| 6,659,873 B1 * | | 12/2003 | Kitano et al. ................. 463/42 |
| 6,749,508 B2 * | | 6/2004 | Kohira et al. ................. 463/31 |
| 6,906,713 B2 * | | 6/2005 | Koshiro et al. ............. 345/420 |
| 6,908,389 B1 * | | 6/2005 | Puskala ........................ 463/40 |
| 6,913,536 B2 * | | 7/2005 | Tomizawa et al. ............ 463/43 |
| 6,913,537 B2 * | | 7/2005 | Kobayashi et al. ........... 463/43 |
| 6,923,717 B2 * | | 8/2005 | Mayer et al. ................... 463/4 |
| 6,932,705 B2 * | | 8/2005 | Nakazato ..................... 463/31 |

(Continued)

FOREIGN PATENT DOCUMENTS

EP    0919266    6/1999

(Continued)

OTHER PUBLICATIONS

Access Software: "Links LS 1998 Edition Player's Manual Passage", Links LS Player's Manual, XX, XX, Jun. 30, 1997, pp. 1-7.

(Continued)

*Primary Examiner*—Xuan M. Thai
*Assistant Examiner*—Ross A. Williams
(74) *Attorney, Agent, or Firm*—Alson & Bird LLP

(57) ABSTRACT

The present invention concerns an electronic gaming system configured to provide for end-user control of an on-screen gaining character, the system comprising means for generating an on-screen graphical element comprising first and second markers which are arranged to move relative to one another during operation of the system, the arrangement being such that in operation when said first and second markers attain a pre-defined positional relationship relative to one another the on-screen gaming character is controllable to perform a pre-determined action. Hence, there is provided a timing and reaction based control system configured to allow an end user to interact with an electronic same so as to control the on-screen character to perform actions, movements or tricks.

19 Claims, 9 Drawing Sheets

U.S. PATENT DOCUMENTS

2001/0008844 A1    7/2001  Yamauchi et al.
2001/0016511 A1*   8/2001  Hino et al. .................... 463/8

FOREIGN PATENT DOCUMENTS

| EP | 1060770 | 12/2000 |
| EP | 1114660 | 7/2001 |
| EP | 1116505 | 7/2001 |
| EP | 1 127 598 A2 | 8/2001 |
| EP | 1127598 A2 * | 8/2001 |

OTHER PUBLICATIONS

F. Provo; "ESPN The Games: International Track& Field Review" Gamespot.com, Oct. 31, 2000, pp. 1 and 2.

\* cited by examiner

MOBILE GAMING

BACKGROUND OF THE INVENTION

The present invention relates to electronic games and in particular to electronic games in the context of mobile gaming.

Against this background, the present invention in one aspect resides in an electronic gaming system configured to provide for end-user control of an on-screen gaming character, the system comprising means for generating an on-screen graphical element comprising first and second markers which are arranged to move relative to one another during operation of the system, the arrangement being such that in operation when said first and second markers attain a pre-defined positional relationship relative to one another the on-screen gaming character is controllable to perform a pre-determined action.

SUMMARY OF THE INVENTION

The present invention concerns systems, apparatus and methods relating to a timing and reaction based control system configured to allow an end user to interact with an electronic game so as to control the on-screen character to perform actions, movements or tricks.

Thus the invention in its various aspects serves to provide a versatile control system that allows an end-user to control his on-screen character to perform a wide range of tricks and stunts. Advantageously, the invention reflects the skill and difficulty involved in performing such tricks in the real world and translates this into and workable control system that in preferred forms is suitable for a mobile device.

In known electronic games systems, actions and tricks carried out by on-screen characters are often performed by a combination of joystick moves and key presses, all on an dedicated games controller interface. Typically, a portable radio communication device such as a mobile phone is not equipped with this type of interface, and thus the present invention addresses the need for a control system which would allow an end user to control his on-screen character to perform a large number of moves and tricks whilst accommodating the limitation of the input offered by a mobile phone's key/dial pad.

Conveniently, the solution provided by the present invention enables the use of as few keys as possible in order to create as simple an interface as possible.

The invention extends to areas concerned with client-server systems and the downloading and more generally enabling the provision of content for a client terminal.

Other aspects and features of the invention are defined in the appended claims.

BRIEF DESCRIPTION OF THE DRAWINGS

In order to aid a better understanding of the present invention, embodiments of the invention will now be described. These should not be construed as limiting the invention but merely as examples of specific ways of putting the invention into effect. In particular, the invention will be described with reference to the accompanying drawings in which.

DETAILED DESCRIPTION OF THE INVENTION

Figure 1:
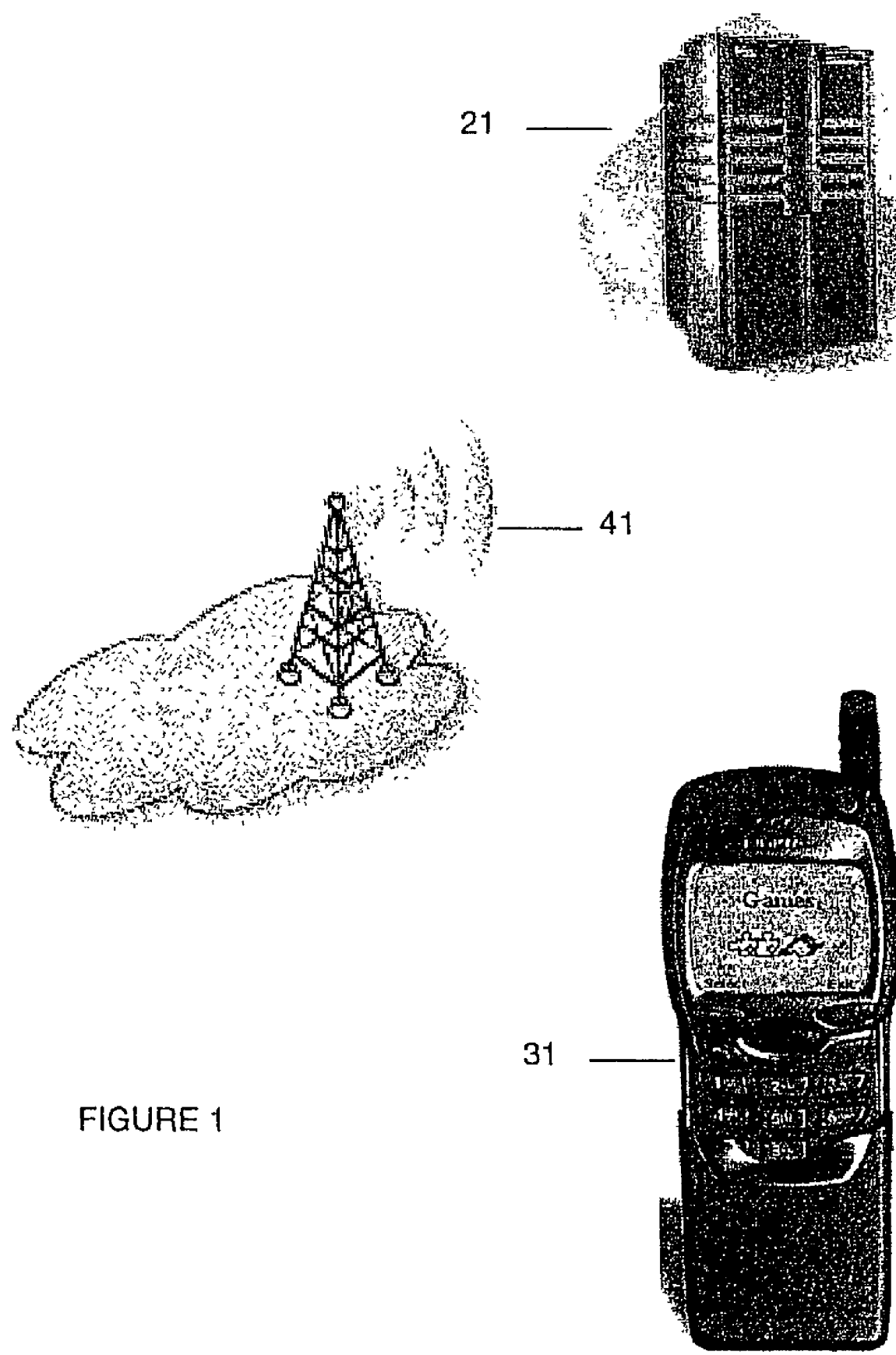
FIG. 1 is a schematic of a client-server system in accordance with a preferred arrangement of the present invention.

FIG. 1 outlines three entities of the present invention, namely a server 21 that holds content for downloading, an end user's mobile phone 31 that is able to download the content, and an operator network 41 that provides a telecommunications service to the mobile phone 31. The server 21 has a unique URL address and using this can be accessed by the end user through the mobile phone 31 which may be WAP, iMODE, 2.5 or 3G enabled, and which is equipped for mobile gaming.

In the following example, reference will be made to mobile gaming and games content for a mobile phone platform, although the invention is in no way intended to be limited to mobile gaming; its application will also work in the field of any other electronic/video games.

Mobile gaming is a term used to refer to all aspects of electronic games in the context of mobile communications. It is not uncommon nowadays for mobile phones to have, pre-loaded on a memory of the phone, content relating to one or more electronic games. The game is run by the mobile phone's processor, and it is played using the phone's User Interface (UI) which normally involves the use of the display and one or more of the keys. In order to play a game, the end user navigates through the phone's various main menu options to the Games option and then selects the particular electronic game he or she wishes to play. Certain keys of the mobile phone's keypad are pre-assigned for enabling the end user to control certain predetermined features of the game, usually in relation to other features of the game which are under the control of the software of the game. In this way, the end user can be regarded as playing 'against the computer'. Additionally, in a multi-player session in which two (or more) players play the game against each other, each end user (player) controls his/her particular game's character to compete with the other player(s).

Typically, an electronic game which is designed to be played on a mobile phone platform is created by a content provider, who may be the mobile phone manufacturer or a third party. Like any platform wishing to execute games software of an electronic game, the mobile phone makes use of its memory for storing the game and its processor for running the game. The electronic game comprises a games engine that provides the general functions of the game including instructions and routines for gameplay, for example by drawing of library functions that define how games characters may interact during game play. The electronic game also has gaming parameters that set out the environmental factors that define the backdrop to the game. Then there are gaming parameters relating to characters of the games, these being entities of the game under end user control and with which the end user during gameplay associates himself, for instance a team in a sports game, or a fighter in a combat game. In the games content, a combination of these factors define the look and feel of the game, its characters, its objectives, its rules of operation.

In order to afford variation in gameplay, in-built into the games software, typically, is the ability to have different levels of gameplay ranging in complexity. This is usually implemented in the software by making changes to characters, features, aspects and other parameters of the basic gameplay. The content provider may additionally create new levels and/or versions for the game. When new levels and/or versions are applied to the game it modifies the games content. Modified games content has associated with it an identifier tag that identifies the version that has been used in its construction. Typically, as the content provider continues to design and develop more challenging and innovative versions of the games, so the end user continues to remain interested and engaged. In addition, when these new levels are provided on an internet website for downloading therefrom, the mobile phone manufacturer or content provider benefits in increased traffic and stimulating content for the website.

The mobile phone manufacturer may embed the games content onto the phone during manufacture, or authorise downloading of the games content onto the phone.

As indicated previously, the present invention sets out to enhance the interaction experience of an end-user with his on-screen character by providing a timing and reaction based control system allowing the on-screen character to perform actions or tricks.

In a preferred form of the invention, the system comprises three elements:
  A key control interface (for example, the keys on a phone key/dial pad or the buttons on a game controller);
  An on-screen graphical "bar";
  A list of tricks or actions that can be performed by the player.

The key control interface is a feature of the UI and may for example be provided by the keys of a phone key/dial pad, or the buttons on a games controller/joystick.

The on-screen graphical bar (which herein will be referred to as a "reaction bar") is a software generated graphical device that is displayed on the phone's display along with the other graphical features of the game. During gameplay the reaction bar is displayed on-screen at an appropriate time. This may be as a consequence of the context of the game, or because the player has pressed a key that has caused it to appear. The reaction bar serves to provide an end-user with a visual on-screen interface that allows for correlation between key depressions with timing elements resulting in various on-screen character actions. The reaction bar, moreover the control system of the present invention as whole, gives an end-user the opportunity to make the on-screen character carry out some or other action in response to depression of a given key (or keys) at a given moment in time with reference to the reaction bar.

Figure 2:
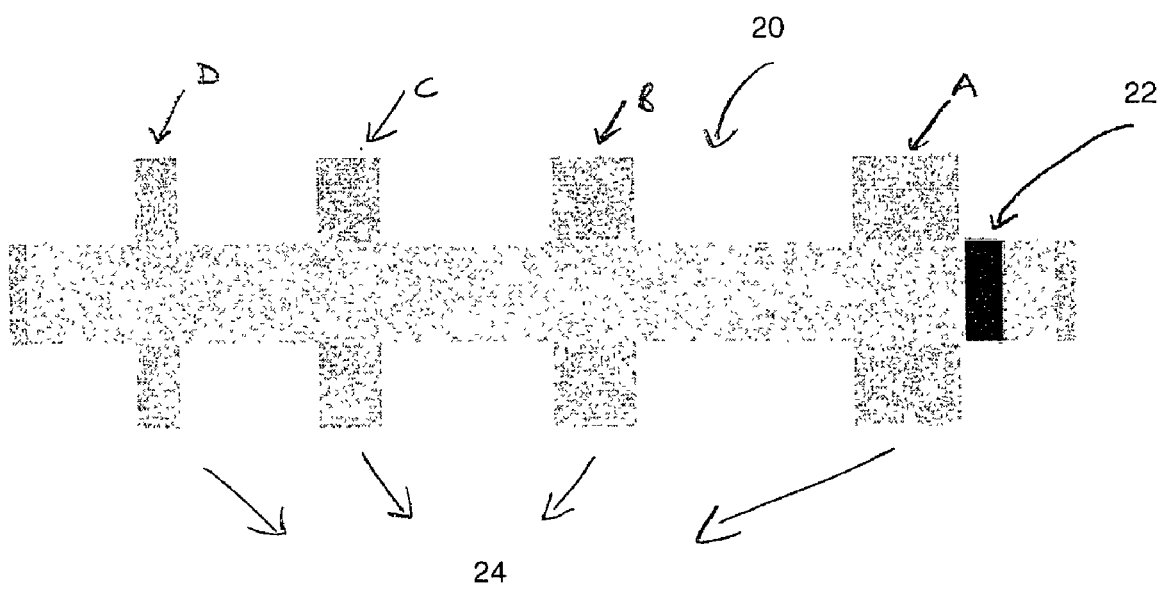
FIGS. 2 to 6 illustrate a first embodiment of the present invention.
Figure 3:
Figure 4:
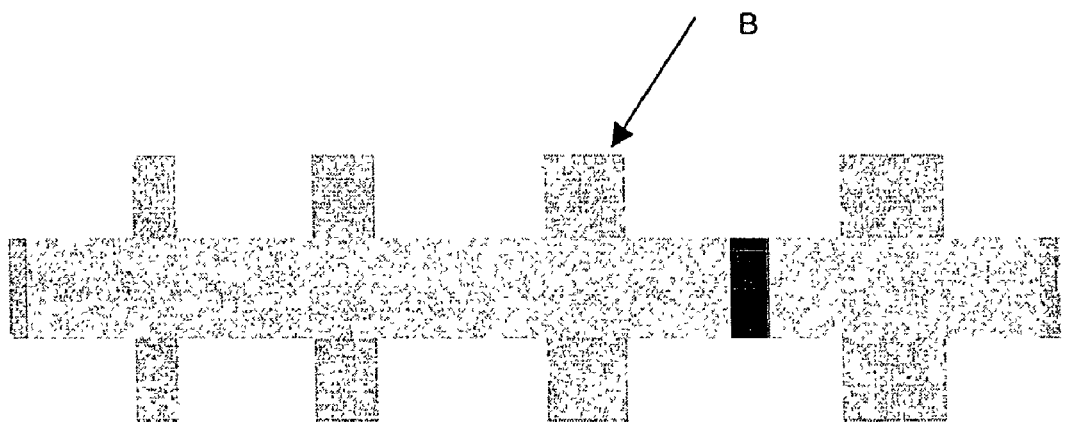
Figure 5:
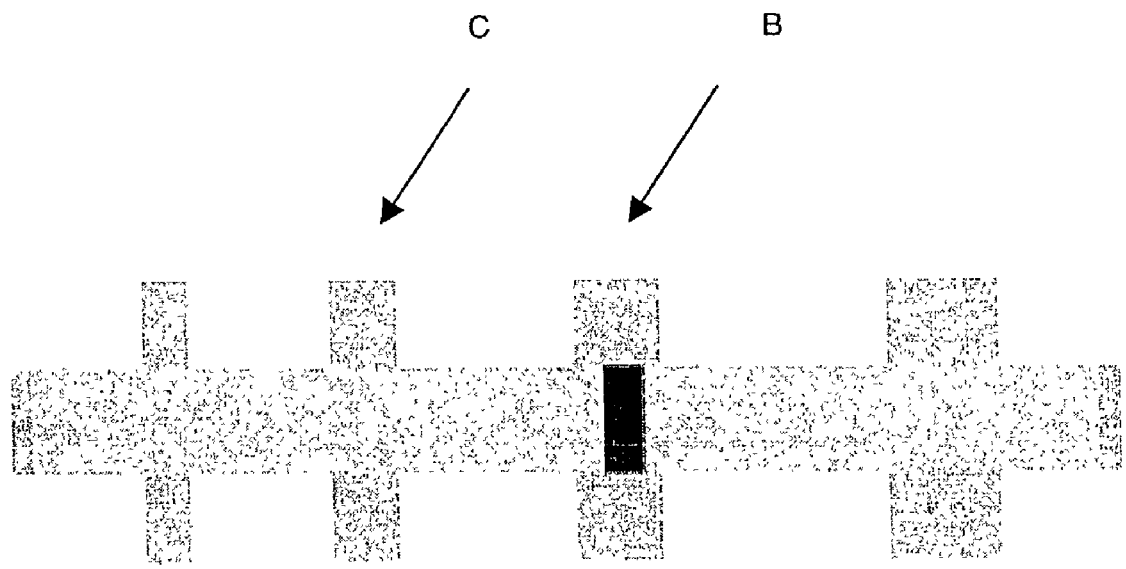
Figure 6:
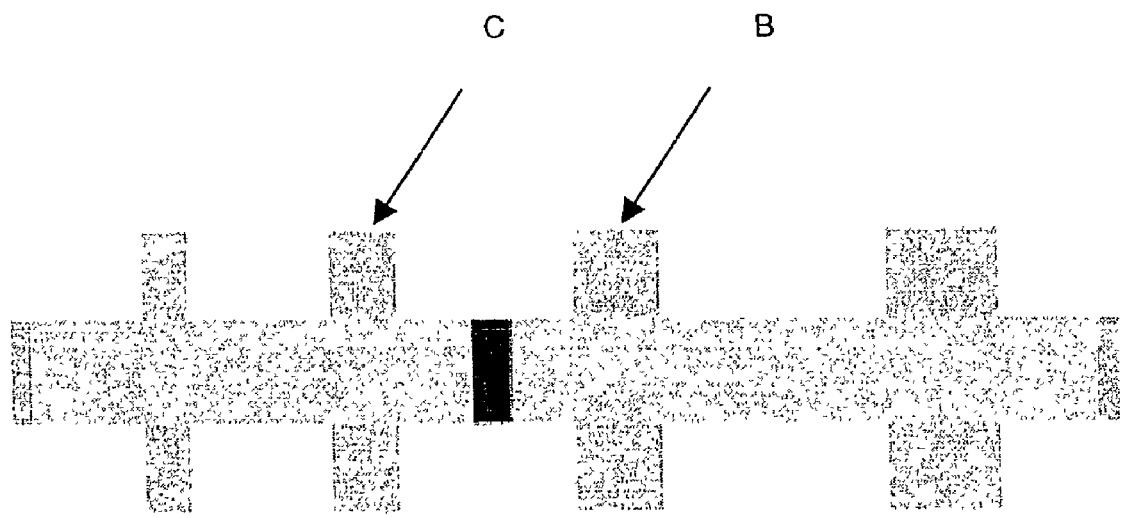

In its simplest form, the reaction bar presents two markers that move relative to one another and which at some instant in time come into alignment with one another. The movement of the markers relative to one another represent the timing aspect of the invention. FIG. 2 illustrates one form of reaction bar (20) in isolation from other game graphics. In this embodiment there is one marker (22) that is configured to slide along the bar, and a series of other markers (24) disposed at spaced apart locations along the length of the bar. The moving marker travels from one end of the reaction bar to the other and sequentially moves in and out of alignment with each of the fixed markers. From its starting end, the moving marker travels along the bar at a pre-determined rate and comes into registration first with fixed marker A; this is given by when the moving marker slides into and through the zone defined by the width of marker A as illustrated in FIG. 3. As the moving marker continues to travel along the bar it exits the zone of marker A and travels towards marker B as shown in FIG. 4. Thus, the moving marker approaches fixed marker B, enters the zone defined by marker B (see FIG. 5), traverses through marker B and exits marker B (see FIG. 6). Likewise, the moving marker moves towards and through the zones defined by markers C and D. Having passed through the four markers, the moving marker reaches the finish point at the end of the reaction bar. The instances in time when the moving marker is within the zones defined by the markers represent the instances in time at which the end user must press a key in order to make the on-screen character perform a corresponding action.

It is possible to modify the markers in a variety of ways to change the difficulty and skill levels involved in performing certain moves. For instance, the speed of movement of the moving marker can be increased or decreased, which respectively leads to harder or easier gameplay. Additionally, the size, that is the width, of the fixed markers can be made to decrease in size from the start to the end of the bar. This allows a smaller margin of error for the end user with each consecutive press, as the range, and hence time period, at which the moving and fixed markers are aligned will be smaller. Also, the distance between say markers C and D can be smaller than that between A and B. Thus, as the moving marker travels along the bar, the user must be faster with each subsequent key press.

Figure 7:
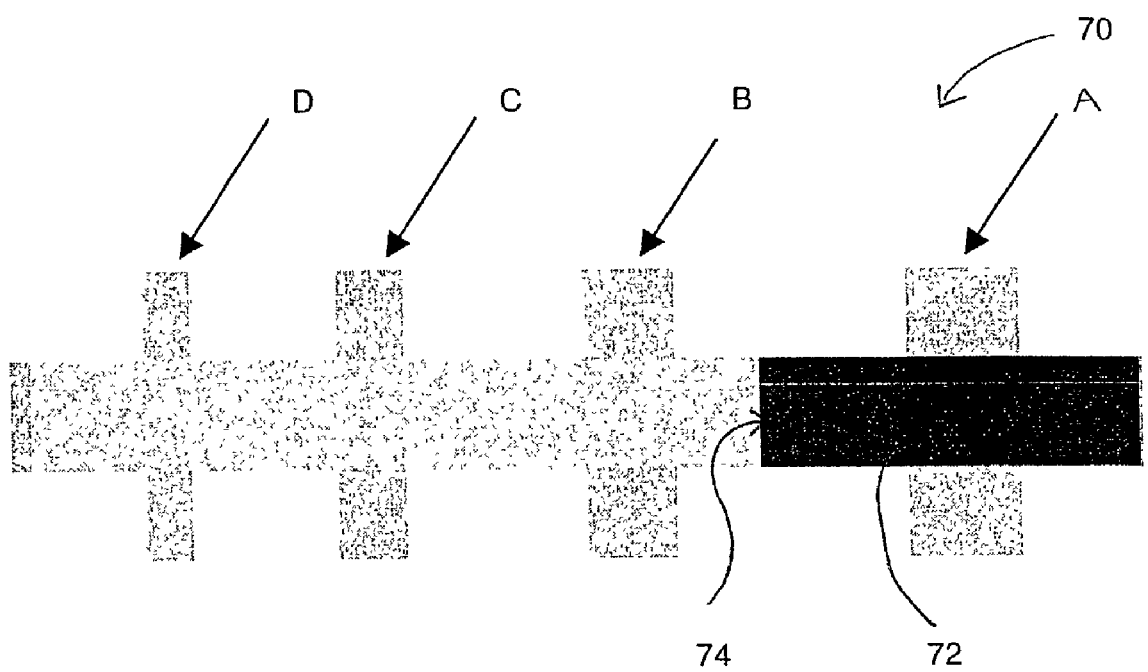
FIG. 7 illustrates a second embodiment of the present invention.

An alternative configuration is shown in FIG. 7, in which the reaction bar 70, instead of being embodied as a small rectangular marker with two side edges, is embodied as a solid area marker 72 that begins to "fill in" the reaction bar from its starting end and then continues to do so as it moves along the bar from one end to the other. In FIG. 7, the markers is shown as having already traversed marker A and is approaching marker B. In this embodiment, the instances in time when the leading edge 74 of the moving marker is within the zones defined by the markers represent the points in time at which the end user needs to press a key in order to make the on-screen character perform a certain action.

In a specific form, the present invention is implemented in an electronic game suitable for a mobile phone, and this implementation in the electronic game replicates the popular sport of snowboarding. In the electronic snowboarding game the end-user has control over the actions of an on-screen snowboarder character. To control the on-screen snowboarder the end-user makes use of the array of keys on keypad of the mobile phone. When the mobile phone is in electronic game mode certain keys of the keypad are designated as a jump/land key, turn left, turn right keys, go faster and brake keys and two keys to activate the snowboarder to perform tricks. As an alternative to accelerate and brake keys the slope of ground determines the speed of the snowboarder and the snowboarder slow down by turning. Since in snowboarding tricks are typically performed when the snowboarder is "catching air" (i.e. when the base of the board is lifted from the ground) the tricks keys may be the same keys as the go faster and brake keys since these are effectively dysfunctional when the snowboarder is in the air.

Figure 8:
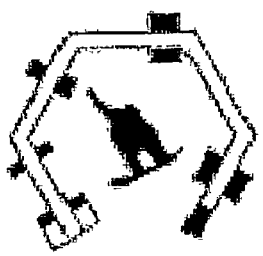
FIGS. 8 to 13 illustrate a third embodiment of the present invention.
Figure 9:
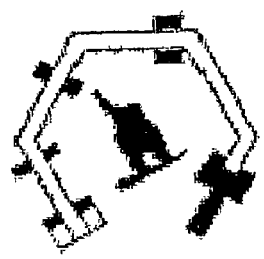
Figure 10:
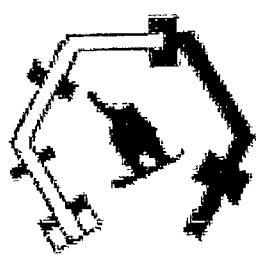

During gameplay the end user maneuvers the on-screen snowboarder to snowboard down a slope, weaving from one side to the other using the left and right keys, and accelerating and braking using the go faster and brake keys. The end user may elect to make his snowboarder perform a jump off a ramp. So as the end user encounters an on-screen ramp, he directs the snowboarder towards the ramp. As the snowboarder hits the ramp the end-user presses the jump key on the keypad. The moment at which the user presses the jump key causes the snowboarder to spring into the air. At the same time the reaction bar is brought up on the mobile phone's display. FIG. 8 illustrates the reaction bar of this embodiment. Straight away the fill-in marker begins travelling from one end of the bar to the other (see FIG. 9). The rate at which the fill-in marker travels around the reaction bar is determined by the maximum height that the snowboarder will reach. This in turn is a consequence of how fast the snowboarder was travelling down the slope and the particular point on the ramp at which the end-user pressed the jump key. In order to make the snowboarder perform various tricks and moves while he is "catching air", the end-user must press one or both of the two trick keys (which conveniently may be designated as the keys given by the 4 and 6 keys on the keypad). However, in order to execute a trick successfully the end-user must press the trick keys when the fill-in marker attains alignment with one of the fixed markers, that is, when the moving marker is within the zone defined by the fixed marker, as is illustrated in FIG. 10.

The end user is free to choose at which markers his snowbosrder is to perform tricks. This need not be the first marker, but can be subsequent markers. In fact, the end-user can elect to start the first trick by pressing a trick key at any fixed marker on the bar. However, as each marker is smaller than the previous marker and as the space between the markers is sequentially smaller, it becomes increasingly harder to perform more complex tricks and thus the end-user must be more accurate with his key depressions.

Figure 11:
Figure 12:
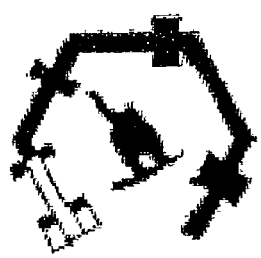

Once a trick has been initiated the fill-in marker continues around the reaction bar and the end-user can either complete the current trick and straighten up ready for landing, or can start another trick at the next and subsequent fixed markers. To complete a trick, the end-user may press the same key as used to begin the trick at the next marker on the bar (see FIG. 11). Again, the end-user need not necessarily use this marker, but can press the key at any subsequent marker (e.g. at the marker in FIG. 12), and in this way the end user may be able to control his snowboarder to perform a trick within a trick.

Figure 13:
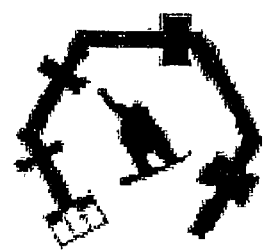

At the end of the tricks sequence the end-user must press the jump key in the landing zone illustrated in FIG. 13 to land the snowboarder and so complete the sequence. If the end-user has started a trick at the last marker he still must press the jump key in the landing zone. End-users who have jumped but have elected not to perform any tricks are still required to land the jump in the landing zone.

The number of tricks and actions that he snowboarder can perform is determined by the number of control keys used and the number of markers on the reaction bar. For example, if there are 2 control keys and 3 marker points on the bar, then the possible number of actions is 2 keys to the power of 3 markers=8 unique actions.

In the snowboarding game, a real-time version is preferred in which tricks run one after the other, although a slightly less real-time version is also contemplated in which the entire key sequence is used and only one action is performed. That is to say, in one instance, key presses at markers 1, 2 and 3 will produce 2 actions (press at 1 to begin, press at 2 to finish action 1 and begin action 2, press at 3 to end action 2), whereas in the other, presses at markers 1, 2 and 3 will produce only one action because the moves are stored and played out as a combination once the final move of the sequence has been completed (press at 1 to begin, press at 2 to summon second level sequence, press at 3 to finish sequence and elicit action).

In this way, the system allows for a reduction in the number of action keys needed in order to produce various moves, and also provides a system whereby it is easy for the end user to remember trick combinations.

The requirement for pressing a key during the periods of alignment of the fixed and moving markers tests the reaction and eye to hand co-ordination of the end-user. Hence it will be appreciated that the reaction bar introduces an element of timing to the available tricks and moves of the snowboarding game. Only correct actuation of keys with reference to the timing element of the reaction bar will allow successful execution of the desired trick. Incorrect actuation of the key with respect to the timing element of the reaction bar results in incomplete (or no) execution of desired actions.

Many variations are possible to the embodiment described above. It may be that both markers are made to move relative to one another (possibly at different rates). Or the "fixed" markers may be configured to "jiggle" from side to side. This would make pressing the correct key right on the marker more challenging as the bar would be filling in at a different rate to the movement of the marker.

Figure 14:
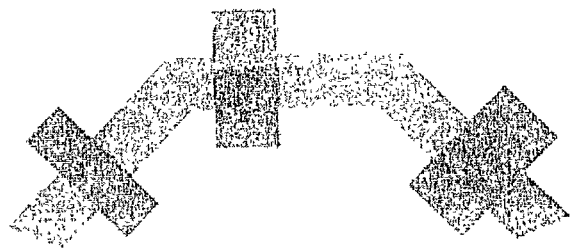
FIGS. 14 to 16 illustrate further variants of the present invention.
Figure 15:
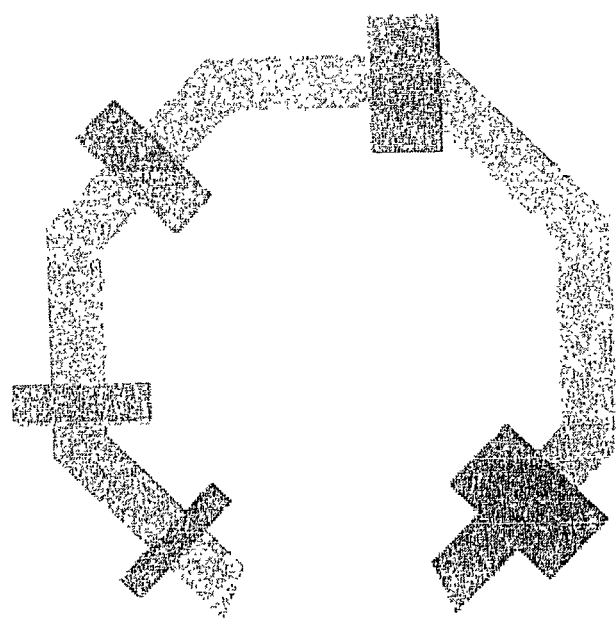
Figure 16:
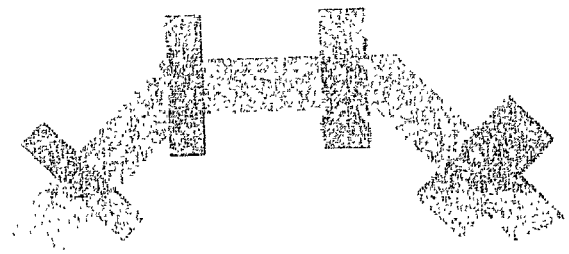

Different types of jumps in the snowboarding game may have different associated reaction bars. FIGS. 14, 15 and 16 illustrates possible reaction bars for a standard jump, a big ramp jump and a half pipe jump. In each case, the length of the reaction bar is representative of the height and length of the jump and therefore is indicative of the amount of time the snowboarder will spend in the air. A jump from the big ramp will allow the snowboarder to be in the air for the longest period of time and thus the reaction bar associated with the big ramp (see FIG. 15) is the longest. The shortest reaction bar as show in FIG. 14 relates to a normal downhill jump that is perfumed by the snowboarder jumping up whilst snowboarding down a slope. It is the shortest reaction bar as this corresponds to the shortest time the snowboarder is in the air and able to perform tricks. FIG. 16 illustrates a reaction bar associated with a half pipe jump, and this bar reflects the extended amount of time that the snowboarder is in the air and also has additional markers along its length which reflect the additional opportunities for carrying out tricks on a half pipe jump.

However, if the snowboarder misses the first marker on half-pipe then he miss out on the trick completely.

A reaction bar may also include a "warm-up section". This is a section of bar before the first marker and allows the end user to gauge how fast the moving marker is moving along the bar and so provides the end user with preparation time to press the appropriate keys at the fixed markers.

Figure 17:
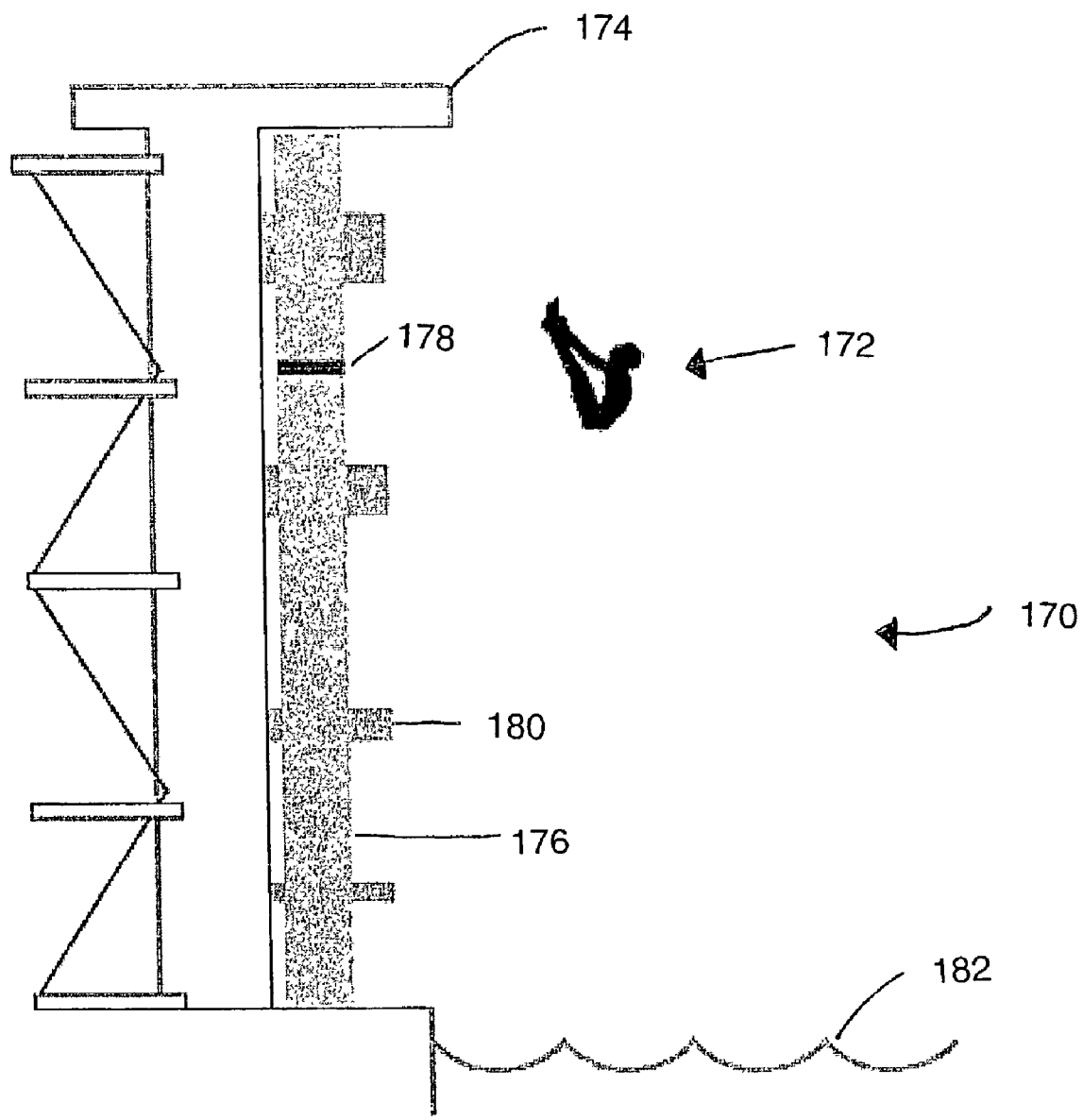
FIG. 17 illustrates another embodiment of the present invention.

FIG. 17 illustrates a further embodiment of the present invention. In this embodiment the reaction bar is utilised in the context of a diving game 170. In the diving game the end user controls the diver 172 to walking towards the edge of the diving board 174. The end user then presses a jump key and the diver takes off from the edge of the board. At the same time the reaction bar 176 appears on the screen. The reaction bar consists of a moving marker 178 that slides down the bar and past a series of fixed markers 180. As the diver descends towards the water 182 the moving marker moves past the fixed markers. In order to control the diver to perform acrobatic moves, the end user must try and press the appropriate keys at the instances when the moving marker is aligned with the fixed markers. Points accrue for performing moves. The end user must control the diver so that he lands optimally in the water. The best dives, which have the highest scores, have the most elaborate moves whilst still ensuring an optimal water entry.

Figure 21:
FIGS. 18 to 21 illustrate a further embodiment of the present invention.
Figure 20:
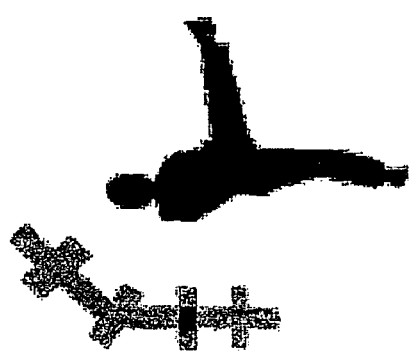
Figure 19:
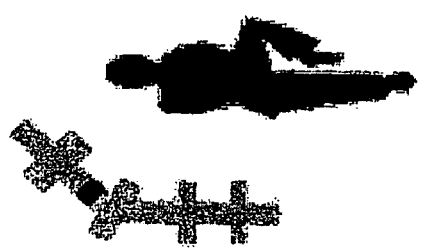
Figure 18:
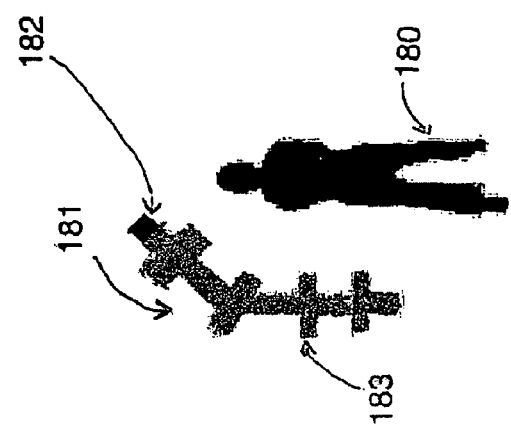

FIGS. 18 to 21 illustrate another embodiment of the present invention in the context of a martial arts game. In this game there is a martial art character 180 under the control of the end-user, and a reaction bar 181 that consists of a moving marker 182 moving along the bar past a series of fixed markers 183. As the moving marker travels along the bar it comes into registration with each of the fixed markers. At these instances the end user must press a given key in order to initiate a given martial arts move. FIGS. 19 to 21 show the character carrying out a move as the moving marker sequentially aligns with the fixed markers and the corresponding key is pressed. FIG. 19 shows the character in a neutral stance ready for action. FIG. 20 shows the character executing a kick move at the instant when the moving marker aligns with the fixed marker and the user presses the appropriate key. FIG. 21 shows the character returning to a neutral position at the point when the moving marker again aligns with a fixed marker and the end user presses the relevant key.

In each of the reaction bar describes above the fixed markers may be split into two, three or move segments. Points could then be scored depending on which of the segments the moving marker is in at the instance when the end user presses the key. Most points could be awarded for successfully hitting the last segment of the fixed marker as mis-firing (firing too late) would result in the end user not pressing within the fixed marker zone and therefore not obtaining any points. This therefore reflects the inherent risk of holding back the key press until the last segment.

A useful feature that may be incorporated into the present invention is that the holding down of a key for extended periods of time when a marker is moving around a reaction bar does not allow successful execution of moves. To be legitimate, the key presses have to be discrete key presses.

Additionally, there may be legends associated with the respective markers indicative of pre-defined moves. These could be related the controller keys as dynamically changing soft keys that may change after a particular move is started.

The advantage of system according to the present innovation is that it is flexible and can be tailored to allow for a large number of different actions, depending on how it is configured. It is straightforward and can make complex moves easy for the user to remember. It makes a correlation between the complexity of a manoeuvre in the real world and in the games world.

In view of the foregoing, it should be appreciated that the present invention may be embodied in other specific forms without departing from its essential attributes. For example the reactions bar may be termed a time bar, status bar, a trickometer, and may be embodied graphically in a bar, band, meter, gauge, arc, or window. Likewise, markers may be tags, flags, graphical indicators of any form.

Reference should thus be made to the appended claims and other general statements herein rather than to the foregoing description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. An electronic gaming system configured to provide for end-user control of at least one on-screen gaming character, the system comprising software code for generating an on-screen graphical element comprising first and second markers which are arranged to move relative to one another during operation of the system, the arrangement being such that in operation when the first and second markers attain a pre-defined positional relationship relative to one another the on-screen gaming character is controllable to perform a pre-determined action, wherein the first marker comprises a plurality of target markers, and wherein the plurality of target markers provide pre-defined timing windows at spaced apart locations along a time-line, the pre-defined timing windows being of different duration that become successively shorter in time, and wherein the duration of each of the pre-defined timing windows is adjustable by a user depending on in-game actions the at least one gaming character performs during execution of the software code.

2. A system according to claim 1, wherein the on-screen gaming character is controllable to perform the pre-determined action by the end-user actuating a controller provided for playing the game.

3. A system according to claim 1, wherein the graphical element includes a bar and the second marker comprises a moving marker arranged to move along the bar relative to the plurality of target markers.

4. A system according to claim 3, wherein the attained pre-defined positional relationship of the plurality of target markers and the second marker relative to one another corresponds to when the moving marker respectively comes into registration.

5. A system according to claim 4, wherein user actuation of a controller at the instance when the moving marker comes into registration with a target marker causes the on-screen character to perform a pre-determined action.

6. A system according to claim 4, wherein user actuation of a controller at a first instance when the moving marker comes into registration with a first target marker causes the on-screen character to perform a corresponding first predetermined action, and user actuation of the controller at a second instance when the moving marker comes into registration with a second target marker causes the on-screen character to perform a corresponding second pre-determined action that is complementary to the first action.

7. A system according to claim 1, wherein the electronic game system comprises a mobile device.

8. A system according to claim 1, wherein the graphical element includes a bar, and wherein the second marker comprises an enlarging marker arranged to enlarge in size along the bar relative to the plurality of target markers.

9. A method for controlling an on-screen gaming character of a computer game, the method comprising providing an on-screen graphical element comprising first and second markers which are arranged to move relative to one another during operation of the game, controlling the on-screen gaming character to perform a pre-determined action when the first and second markers attain a pre-defined positional relationship relative to one another, wherein the first marker comprises a plurality of target markers, and wherein the plurality of target markers provide pre-defined timing windows at spaced apart locations along a time-line, the pre-defined timing windows being of different duration that become successively shorter in time, wherein the duration of each of the pre-defined timing windows is adjustable by a user depending on in-game actions the on-screen gaming character performs during execution of the computer game.

10. A method according to claim 9, wherein the electronic game system comprises a mobile device.

11. A method according to claim 9, wherein the graphical element includes a bar, and wherein the second marker comprises an enlarging marker arranged to enlarge in size along the bar relative to the plurality of target markers.

12. A computer program product encoded on a computer-readable medium comprising a software module configured to provide for end-user control of an on-screen gaming character, the module comprising an on-screen graphical element comprising first and second markers which are arranged to move relative to one another during operation of the system, the arrangement being such that in operation when the first and second markers attain a pre-defined positional relationship relative to one another the on-screen gaming character is controllable to perform a predetermined action, wherein the first marker comprises a plurality of target markers, and wherein the plurality of target markers provide pre-defined timing windows at spaced apart locations along a time-line, the pre-defined timing windows being of different duration that become successively shorter in time, and wherein the duration of each of the pre-defined timing windows is adjustable by a user depending on in-game actions the on-screen gaming character performs during execution of the computer program product.

13. A computer program product according to claim 12, wherein the graphical element includes a bar, and wherein the second marker comprises an enlarging marker arranged to enlarge in size along the bar relative to the plurality of target markers.

14. A gaming device including games content for a gaming system configured to provide for end-user control of an on-screen gaming character, the device having a memory for storing the games content and a processor for processing the games content, the processor being operable to execute a program configured to provide for end-user control of at least one on-screen gaming character, the program comprising software code for generating an on-screen graphical element comprising first and second markers which are arranged to move relative to one another during operation of the system, the arrangement being such that in operation when the first and second markers attain a pre-defined positional relationship relative to one another the on-screen gaming character is controllable to perform a pre-determined action, wherein the first marker comprises a plurality of target markers, and wherein the plurality of target markers provide pre-defined timing windows at spaced apart locations along a time-line, the pre-defined timing windows being of different duration that become successively shorter in time, and wherein the duration of each of the pre-defined timing windows is adjustable by a user depending on in game actions the on-screen gaming character performs during execution of the program.

15. An electronic gaming system configured to provide for end-user control of at least one on-screen gaming character, the system comprising software code for generating an on-screen graphical element comprising first and second markers which are arranged to move relative to one another during operation of the system, the arrangement being such that in operation when the first and second markers attain a pre-defined positional relationship relative to one another the on-screen gaming character is controllable to perform a pre-determined action, wherein the first marker comprises a plurality of target markers, and wherein the plurality of target markers provide pre-defined timing windows at spaced apart locations along a time-line, the pre-defined timing windows being of different duration that become successively shorter in time, wherein the duration of each of the pre-defined timing windows is adjustable by a user depending on in game actions the at least one on-screen gaming character performs during execution of the software code, and wherein, if a user does not actuate a controller at a first instance when the moving marker comes into registration with a first target marker, the on-screen character does not perform any pre-determined action, while the user remains free to actuate the controller at a second instance when the moving marker comes into registration with a second target marker, which causes the on-screen character to perform a corresponding pre-determined action.

16. An electronic gaming system configured to provide for end-user control of at least one on-screen gaming character, the system comprising software code for generating an on-screen graphical element comprising first and second markers which are arranged to move relative to one another during operation of the system, the arrangement being such that in operation when the first and second markers attain a pre-defined positional relationship relative to one another the on-screen gaming character is controllable to perform a pre-determined action, wherein the first marker comprises a plurality of target markers, and wherein the plurality of target markers provide pre-defined timing windows at spaced apart locations along a time-line, the pre-defined timing windows being of different duration that become successively shorter in time, wherein the duration of each of the pre-defined timing windows is adjustable by a user depending on in game actions the at least one on-screen gaming character performs during execution of the software code, and wherein the graphical element includes a bar, and wherein the second marker and at least one of the target markers is movable relative to the bar.

17. A method for controlling an on-screen gaming character of a computer game, the method comprising providing an on-screen graphical element comprising first and second markers which are arranged to move relative to one another during operation of the game, controlling the on-screen gaming character to perform a pre-determined action when the first and second markers attain a pre-defined positional relationship relative to one another, wherein the first marker comprises a plurality of target markers, and wherein the plurality of target markers provide pre-defined timing windows at spaced apart locations along a time-line, the pre-defined timing windows being of different duration that become successively shorter in time, wherein the duration of each of the pre-defined timing windows is adjustable by a user depending on in-game actions the on-screen gaming character performs during execution of the computer game and wherein, if a user does not actuate a controller at a first instance when the moving marker comes into registration with a first target marker, the on-screen character does not perform any pre-determined action, while the user remains free to actuate the controller at a second instance when the moving marker comes into registration with a second target marker, which causes the on-screen character to perform a corresponding pre-determined action.

18. A method for controlling an on-screen gaming character of a computer game, the method comprising providing an on-screen graphical element comprising first and second markers which are arranged to move relative to one another during operation of the game, controlling the on-screen gaming character to perform a pre-determined action when the first and second markers attain a pre-defined positional relationship relative to one another, wherein the first marker comprises a plurality of target markers, and wherein the plurality of target markers provide pre-defined timing windows at spaced apart locations along a time-line, the pre-defined timing windows being of different duration that become successively shorter in time, wherein the duration of each of the pre-defined timing windows is adjustable by a user depending on in-game actions the on-screen gaming character performs during execution of the computer game and wherein the graphical element includes a bar, and wherein the second marker and at least one of the target markers is movable relative to the bar.

19. An electronic gaming system configured to provide for end-user control of at least one on-screen gaming character on a mobile electronic device, comprising software code for generating an on-screen graphical element comprising first and second markers, the first marker arranged to move relative to the second marker during operation of the system, the arrangement being such that in operation when the first and second markers attain a predefined positional relationship relative to one another, the on-screen gaming character is controllable to perform a pre-determined action, wherein the first marker comprises a plurality of target markers, and wherein the plurality of target markers provide pre-defined timing windows at spaced apart locations along a time-line, the pre-defined timing windows being of different duration that become successively shorter in time, wherein the duration of each of the pre-defined timing windows is adjustable by a user depending on in-game actions the at least one on-screen gaming character performs during execution of the software code, and wherein the computer code is stored on the mobile electronic device.

* * * * *